No. 682,748. Patented Sept. 17, 1901.
E. W. T. RICHMOND.
GRILLING ATTACHMENT FOR GAS STOVES.
(Application filed Dec. 13, 1900.)
(No Model.)

Witnesses

Inventor,
Edmund W. T. Richmond,
by his attorneys

UNITED STATES PATENT OFFICE.

EDMOND W. T. RICHMOND, OF ROMFORD, ENGLAND.

GRILLING ATTACHMENT FOR GAS-STOVES.

SPECIFICATION forming part of Letters Patent No. 682,748, dated September 17, 1901.

Application filed December 13, 1900. Serial No. 39,703. (No model.)

*To all whom it may concern:*

Be it known that I, EDMOND W. T. RICHMOND, a subject of the Queen of Great Britain, residing at Summercourt, Romford, Essex county, England, have invented a certain new and Improved Grilling Attachment for Gas-Stoves, of which the following is a specification.

This device consists of a block or slab of fire-brick inclosed at its edges by a metal frame and having a central aperture therein and preferably having ribs radiating from such aperture. It is specially designed for use in connection with gas-stoves having oval or circular burners, having jets, nipples, or gas-discharge orifices around their inner walls. Such burners are usually arranged in or beneath an opening in the top plate of a gas-stove, and below them is a compartment formed by a shelf to support a pan or other cooking utensil. When it is desired to grill or broil some article of food, the fire-brick is placed over the opening in the top plate. The jets of flame impinge upon it, while the products of combustion escape through the central aperture. The fire-brick becomes highly heated and by reflection and radiation throws the heat downwardly through the opening in the stove-top, and any article of food placed immediately below may be efficiently grilled or broiled. This is a convenient attachment or device to be used in connection with many forms of gas-cookers having the general characteristics which have been described. The fire-brick does not give off any disagreeable or even noticeable odor when highly heated, as described, and acts in a most efficient manner for the purpose intended.

Figure 1:
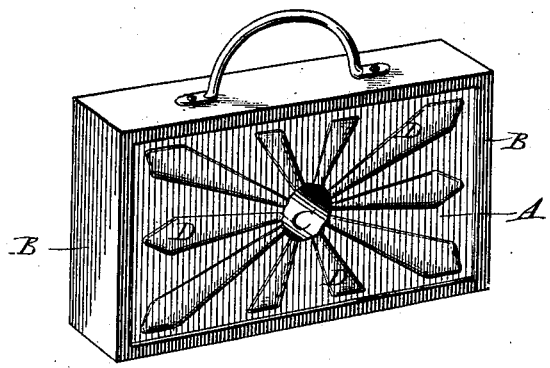
Figure 2:
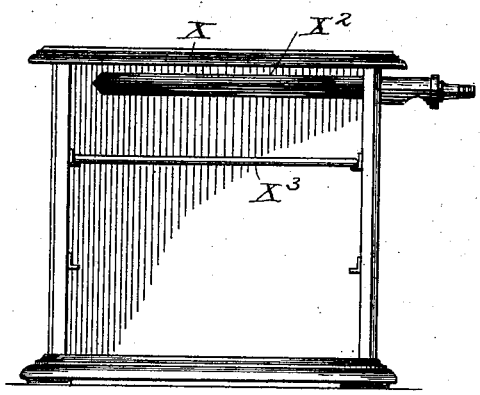
Figure 3:
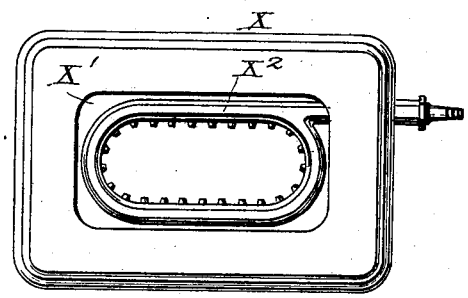

In the accompanying drawings, Figure 1 is view of the grilling device, and Figs. 2 and 3 show a gas-stove with which it may be used.

The grilling device consists of a block or slab of fire-brick A, of suitable contour, held within a rim or inclosing band of iron B, provided with a bail or handle, as shown. It has a central aperture C for the passage of the products of combustion and is preferably formed with rather flat or low ribs D, radiating from such aperture and having curved faces. These ribs, while in a measure serving to direct the products of combustion to the central aperture, perform the function of spreading the flame, which distributes or expands over the faces of the ribs, as well as over the flat intervening spaces, its superficial area being thereby somewhat increased.

X is the top plate of the stove, having the opening X', below which is arranged an oval gas-burner $X^2$. Beneath the burner is a shelf $X^3$ to support the grilling-pan.

I claim as my invention—

1. As a new article of manufacture, a grilling device for gas-stoves, comprising a slab of fire-brick adapted to be placed over the opening in the top plate of a gas-stove, and having a central aperture for the passage of the products of combustion.

2. As a new article of manufacture, a grilling device for use in connection with gas-stoves, comprising a slab of fire-brick, having an aperture for the passage of the products of combustion, and ribs with curved faces radiating from said aperture.

3. As a new article of manufacture, a grilling device for use in connection with gas-stoves, comprising a slab of fire-brick, inclosed by a metal band provided with a handle, and having an aperture for the passage of the products of combustion, and ribs with curved faces radiating from said aperture.

In testimony whereof I have hereunto subscribed my name.

EDMOND W. T. RICHMOND.

Witnesses:
KATHARINE MACMAHON,
EDWARD C. DAVIDSON.